United States Patent [19]

Hara et al.

[11] 4,334,928
[45] Jun. 15, 1982

[54] SINTERED COMPACT FOR A MACHINING TOOL AND A METHOD OF PRODUCING THE COMPACT

[75] Inventors: Akio Hara; Shuji Yazu, both of Itami, Japan

[73] Assignee: Sumitomo Electric Industries, Ltd., Osaka, Japan

[21] Appl. No.: 119,771

[22] Filed: Feb. 8, 1980

Related U.S. Application Data

[63] Continuation of Ser. No. 862,988, Dec. 20, 1977, abandoned.

[30] Foreign Application Priority Data

Dec. 21, 1976 [JP] Japan .................................. 51-154570
May 12, 1977 [JP] Japan .................................. 52-54666
Sep. 21, 1977 [JP] Japan .................................. 52-113987
Nov. 7, 1977 [JP] Japan .................................. 52-133783
Nov. 8, 1977 [JP] Japan .................................. 52-134486
Nov. 22, 1977 [JP] Japan .................................. 52-140486

[51] Int. Cl.³ .............................................. B22F 3/00
[52] U.S. Cl. .......................................... 75/238; 51/307; 51/309; 75/236; 75/237; 75/239; 75/240; 75/241; 75/242; 75/244; 428/552; 428/565
[58] Field of Search .................. 51/307, 309 R; 75/236–242, 244; 428/552, 565

[56] References Cited

U.S. PATENT DOCUMENTS

| | | | |
|---|---|---|---|
| 2,883,555 | 5/1959 | Taylor | 51/307 |
| 2,947,617 | 8/1960 | Wentorf et al. | 51/307 |
| 3,136,615 | 6/1964 | Bovenkerk et al. | 51/307 |
| 3,233,988 | 2/1966 | Wentorf et al. | 51/307 |
| 3,743,489 | 7/1973 | Wentorf et al. | 51/309 X |
| 3,744,982 | 7/1973 | Bovenkerk | 51/307 |
| 3,767,371 | 10/1971 | Wentorf et al. | 51/309 X |
| 3,852,078 | 12/1974 | Wakatsuki | 51/309 X |
| 3,918,219 | 11/1975 | Wentorf et al. | 51/307 |
| 3,918,931 | 11/1975 | DeVries et al. | 51/309 |
| 3,944,398 | 3/1976 | Bell | 51/307 |
| 3,982,911 | 9/1976 | Lee | 51/307 |
| 4,110,084 | 8/1978 | Lee et al. | 51/307 |

FOREIGN PATENT DOCUMENTS 52-102809 8/1977 Japan.

OTHER PUBLICATIONS

Chem. Abs. 77:24170w, 1972.
Chem. Abs. 84:64205n, 1974.

*Primary Examiner*—Brooks H. Hunt
*Attorney, Agent, or Firm*—Wenderoth, Lind & Ponack

[57] ABSTRACT

A sintered compact for use in a machining tool comprising 80 to 10 volume % of a high pressure form of boron nitride, and the balance a matrix of at least one binder compound material selected from the group consisting of a carbide, nitride, carbonitride, boride or silicide of IVa and Va transition metal of the periodic table, their mixtures as well as the solid solution of these compounds; the matrix forming a continuous bonding structure in the sintered body.

A method of producing the compact comprises preparing a mix of 80 to 10 volume % of a high pressure form of a boron nitride powder with 20 to 90 volume % of at least one powdered binder compound selected from the group consisting of a carbide, a nitride, a carbonitride, a boride and a silicide of a IVa, or a Va metal, mixtures thereof or solid solutions of these compounds, and sintering the mix under pressures more than 20 Kb at temperatures higher than 700° C. for more than 3 minutes.

9 Claims, 11 Drawing Figures

SINTERED COMPACT FOR A MACHINING TOOL AND A METHOD OF PRODUCING THE COMPACT

This is a continuation of application Ser. No. 862,988, filed Dec. 20, 1977 now abandoned.

The present invention relates to a sintered compact for use as a machining tool and a method for producing the compact.

High pressure form boron nitride includes cubic form boron nitride (hereinafter referred to as CBN) and wurtzite form boron nitride (hereinafter referred to as wBN). These have the highest hardness next to diamond, and are very promising for grinding and cutting uses.

For grinding, the boron nitride material has already been used broadly. For cutting, a CBN compact bonded by a metal, such as cobalt has been on trial for the market. This compact of CBN bonded by a metal has, when used as a cutting tool, various defects in that the bonding metal is softened at high temperatures to cause the wear resistance to lower and the tool is soon damaged due to becoming welded to a workpiece.

Considering the use of high pressure form boron nitride as a material for a tool, it has excellent properties such as high hardness and high heat conductivity. In a cutting tool, for example, if the other conditions are the same, the higher the heat conductivity of the tool material, the lower the temperature at the cutting tip, which is more advantageous from the standpoint of improving the wear resistance of the tool. In the case of intermittent cutting as in the case of milling cutter, heat shock is imparted to the tool by the rapid rise and fall of the temperature, thereby causing heat cracks. However, when a tool has a higher heat conductivity, the cracks hardly occur, since there will be little temperature differences between the surface and interior of the tool.

A primary object of the present invention is to provide a sintered compact which has high hardness and excellent heat resistance by utilizing the abovementioned properties of a high pressure form boron nitride, and a method of producing the compact.

Other objects and features of the present invention will be apparent from the following description of the invention with reference to the accompanying drawings, in which.

In respect to CBN, in order to produce a sintered compact excellent properties as a machining tool, particularly as a cutting tool, there will be required a binder material which has higher heat conductivity, heat resistance, hardness, wear resistance, toughness, anti-reactivity to a workpiece, than binder metals previously used, such as those containing cobalt.

In the present invention, as binder materials meeting the above requirements, there are selected carbides, nitrides, carbonitrides, borides and silicides of IVa(Ti, Zr, Hf), Va(V, Nb, Ta) and VIa(Cr, Mo, W) group transition metals of the periodic table, mixtures thereof as well as solid solutions of these compounds. These compounds have in common a high hardness values, high welding points, and metallic properties as compared with oxides. Particularly, the heat conductivity of these compounds exhibit a value similar to metals.

Figure 1:
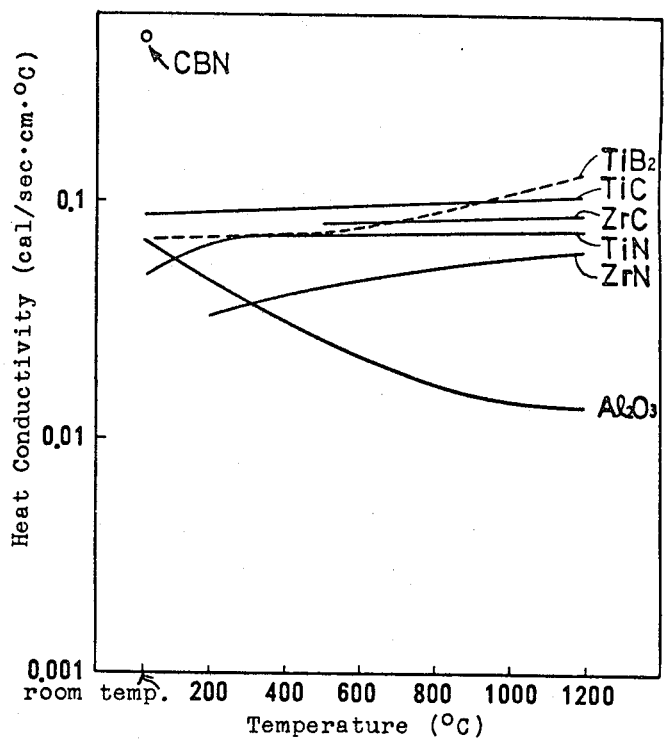
FIG. 1 is a chart showing variations of heat conductivities in relation to the temperatures of CBN and various other compounds.

In view of the heat resistance and strength of various oxides, $Al_2O_3$ in particular has excellent properties and high heat conductivity at room temperatures. However, as shown in FIG. 1, the heat conductivity thereof remarkably lowers at higher temperatures. This is a fatal defect in the application of such materials to cutting tools in which the capacity to withstand high temperatures is most important.

In contrast, the abovementioned compounds have a higher heat conductivity at higher temperatures, as shown in FIG. 1.

Figure 2:
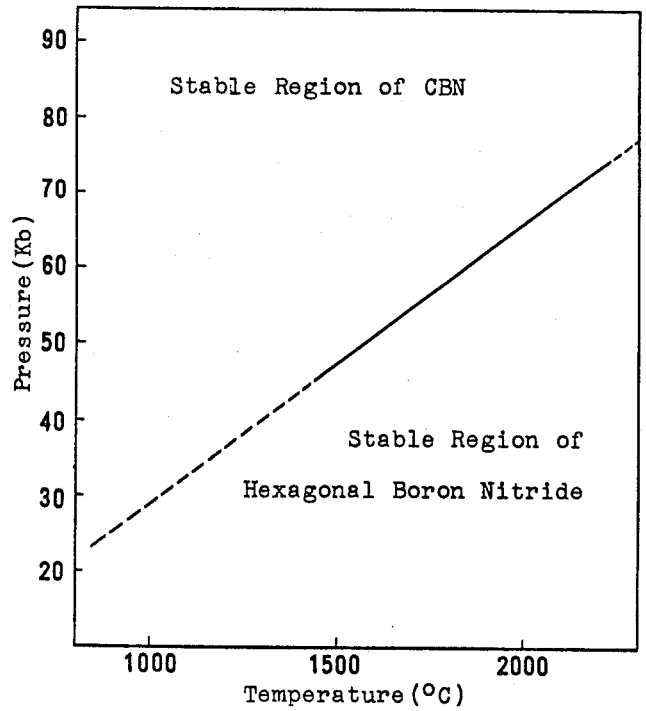
FIG. 2 is a pressure vs temperature chart showing a stable range of CBN.

As for a method of producing a sintered compact from the thus selected binder compounds and CBN, initially, powdered CBN with an average particle size of 0.1 to 100 microns is mixed with at least one compound with an average particle size less than 50 microns, and the powdered mix or its green compact, preformed at room temperatures, is sintered under pressures more than 20 Kb at temperatures higher than 700° C. for more than 3 minutes by means of super-pressure apparatus of a girdle or belt type for making a diamond. As a heating element a graphite tube is used in which is placed an electrical insulation material, such as talc or NaCl which encloses the powdered mix or green compact with the tube. About the graphite tube is put a pressure medium such as pyrophyllite. It is preferable to sinter under pressures at temperatures in the range in which CBN is stable as shown in FIG. 2. However, this range is not strictly determined at present, and provides only a criterion. The conditions may be changed by the heat resistance binder compound employed in combination with CBN.

The most noteworthy feature which gives usefulness to the sintered compact of the invention is that the heat resistance compounds form a continuous matrix in the structure of the sintered compact. That is, in the compact of the invention, the tough, strong heat resistance binder compounds permeates and fills up the clearances between the CBN particles, like cobalt which is a matrix of WC-Co cemented carbide, to form a continuous matrix, thereby giving toughness to the sintered compact.

In order to produce a sintered compact which has the structure mentioned above, it was found as a result of experiments that the CBN amount should be less than 80 volume % in the compact. The lower limit of CBN amount in the compact is 10% by volume. If CBN is less than 10%, the compact cannot demonstrate any performance as a tool which makes uses of the properties of CBN.

Figure 3:
FIG. 3 is a photograph showing a structure of a compact of the invention in a scale magnified 1500 times.

FIG. 3 shows the structure of a sintered compact of the present invention which comprises 60 volume % of CBN and the balance TiN. In the photograph, the matrix of TiN, having a pale appearance, permeated and filled up the clearances between the black CBN particles, thus forming a densely concentrated compact and a continuous matrix of TiN. The reason why such structure is formed is that TiN is softer than CBN at high temperatures so that it permeates into the clearances between the CBN particles during sintering.

In the application of the compact to a tool, the preferable heat resistance binder compounds used as a matrix of the sintered compact of the invention are carbides, nitrides and carbonitrides of IVa and Va transition metals of the periodic table, and their solid solution compounds, among which carbides, nitrides and carbonitrides of Ti, Zr or Hf of IVa group metal are most preferred.

Another reason why carbides, nitrides and carbonitrides of IVa and Va group metals and their solid solutions compounds have excellent properties as heat-resistance binder compounds of the matrix in the compact is as follows:

In respect to nitrides for example, the nitrides of these transition metals are formulated as $MN_{1\pm x}$ (M is a metal of Ti, Zr, Hf, V Nb or Ta, and x exhibits existence of atomic voids or relatively excessive atoms) which exist in a broad range on an M vs nitrogen phase diagram. As a result of experiments by using various nitrides having different x values of $MN_{1\pm x}$, it was found that certain nitrides with x of a limited range show a better degree of sintering.

In the application of the compact to a tool, particularly to a cutting tool, the crystal particle size of the compact is preferably less than several microns. In order to obtain such fine particles, powdered material of CBN should be finer than several microns. A fine powder of several microns or finer particles contains a relatively large amount of oxygen, of which the major part usually exists in the form of a hydroxide or the like. When this hydroxide-like compound is heated, it is decomposed and generates gases. If the material to be sintered is not completely sealed, it is difficult to release the gases out of the system. However, upon sintering under super-pressures as in the present invention, it is impossible to release the gases out of the system. In this case, it is conventional in the field of powder metallurgy to previously outgas the material. However, when high temperatures cannot be applied upon degassing, a problem arises, like in the present case. That is, the heating temperatures are limited in view of the reconversion of CBN to a low pressure form of boron nitride.

The process of degassing a fine powder is performed by the following steps: Initially, physically adsorbed gas and water are removed at lower temperatures. Then, chemically adsorbed gases and hydroxides are removed. What finally remains are oxides. Since CBN is stable at temperatures below about 1000° C., it can be previously heated at least at the point. Therefore, if the pre-treatment of degassing is performed, the remaining gas components are in the form of oxides. However, since it is desirable for the compact to contain as little gas as possible, removal of water and hydrogen the pre-treatment is preferable.

Along the lines mentioned above, all the materials in the present invention are subjected to degassing in a vacuum below $10^{-3}$ mm Hg at temperatures higher than 700° C. for more than 10 minutes.

The reasons why a better compact can be obtained by the addition of $MN_{1\pm x}$ are as follows:

Oxides, perhaps in the form of $B_2O_3$, exist on the surfaces of CBN powder even after the degassing treatment mentioned above. When this $B_2O_3$ and a part of M corresponding to ($-x$) of $MN_{1\pm x}$ react;

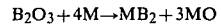

$$B_2O_3 + 4M \rightarrow MB_2 + 3MO$$

whereby no gas is generated. Since MO has the same crystal structure as MN, they form a solid solution. This may be the reason why nitrides of Ti, Zr or Hf shown as $MN_{1\pm x}$ exhibits a higher degree of sintering.

The above can be applied not only to nitrides but also to carbides formulated as $MC_{1\pm x}$, carbonitrides formulated as $M(C,N)_{1\pm x}$, mixtures thereof and their solid solution compounds.

It was confirmed by the inventors that when Ti, Zr, Hf, V, Nb and Ta compounds formulated as $MN_{1\pm x}$, $MC_{1\pm x}$ and $M(C,N)_{1\pm x}$ have a $(1\pm x)$ value of less than 0.97, they exhibit excellent degree of sintering.

Still further, the inventors prepared various materials of $TiN_{1\pm x}$ of which the $(1\pm x)$ values varied within a wide range. Each of the materials is mixed with CBN and sintered at high temperatures under high pressures to produce a compact. As a result of examining the properties of each compact, it was found that in any case of a densely concentrated compact having high hardness, the lattice constant of TiN in the compact was higher than that of the TiN powder material.

Figure 4:
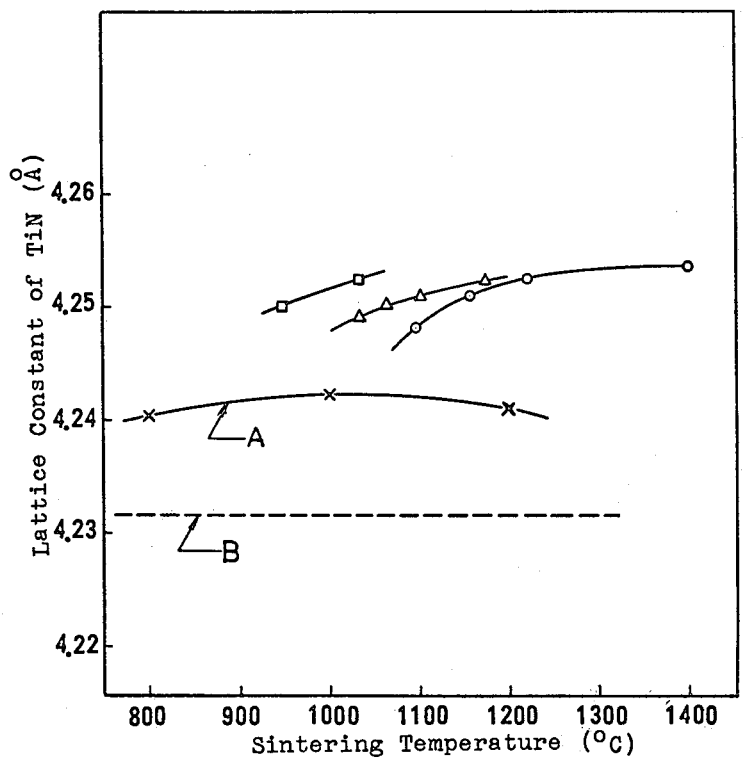
FIG. 4 is a chart showing the lattice constants of TiN contained in a sintered compact of the invention in relation to various sintering temperatures.

FIG. 4 shows the results of measuring, by means of an X-ray diffractmeter, the lattice constants of TiN in the sintered compacts. The compacts are produced under a pressure of 55 Kb at various temperatures by mixing 60 volume % of powdered CBN with three different particle sizes and 40 volume % of $TiN_{0.72}$ (17.4% of nitrogen content in TiN) with an average particle size of 1 micron. In the Figure, the open square shows a CBN compact within average particle size of 1 micron, the open triangle compacts with an average size of 3 microns, and the open circle an average particle size of 5 microns. Line A shows the lattice constants of $TiN_{0.72}$ as a sole compact and line B shows the lattice constant of the powdered material of $TiN_{0.72}$.

Figure 5:
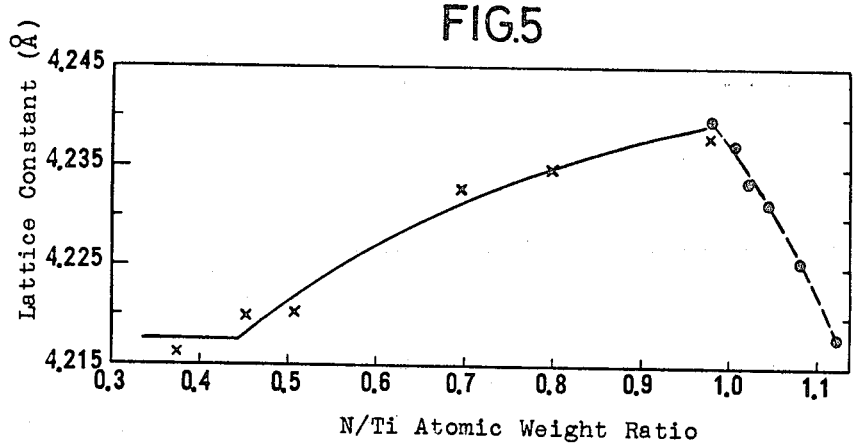
FIG. 5 is a chart showing the atomic weight ratios of nitrogen and titanium in a TiN material in relation to the lattice constants thereof.

The lattice constant of the material of $TiN_{0.72}$ was 4.232 Å, while in the compact of CBN and $TiN_{0.72}$, the lattice constants of TiN as the matrix for the CBN were larger, and exhibited higher values than the maximum of $TiN_{1\pm x}$ which had been heretofore reported, as shown in FIG. 5. The reason why the lattice constants change in the compact of the invention may be as follows: It is known that there exist a great deal of atomic voids between the Ti and N elements of the compound $TiN_{1\pm x}$, even if x is O and it is the stoichiometric compound $TiN_{1.0}$. The $TiN_{0.72}$ compound used for obtaining the experimental results of FIG. 4 has a larger degree of atomic voids in respect to the N than that of Ti. In FIG. 4, the curve A shows lattice constants of compacts obtained by sintering powdered $TiN_{0.72}$, not including CBN, under a pressure of 55 Kb at various temperatures. In this case also, the lattice constants of TiN become higher than that of the powdered material thereof due to the high temperature and pressure treatment. Generally speaking, the higher the atomic void degree, the smaller the lattice constant of the crystal. The change of the atomic void degree may occur due to the movement of atomic voids within the crystal lattice by the high temperature and pressure treatment whereby the void degree decreases to an extent determined by the temperature and pressure employed. This phenomenon has been already reported in connection with TiO having the same crystal structure as TiN.

Now, there can be pointed out the following features in relation to the compacts shown in FIG. 4.

(1) Each point plotted in FIG. 4 is a value of measuring the sintered compact which was densely concentrated and had a high hardness. In the measured range, the lattice constants of TiN in the sintered compact of the invention is higher than those of both the powdered TiN material and the compact which contains only TiN.

(2) The higher the sintering temperature, the larger is the lattice constant, which tends to reach a constant value.

(3) The finer the particle size of the powdered CBN material used, the larger the lattice constant at lower temperatures.

These tendencies may be attributable to the reasons that during sintering, a part of the relatively excess Ti in the $TiN_{1\pm x}$ powder material, produces $TiB_2$ or TiB by the reaction of $TiN_{1\pm x}$ and BN which is the hard component in the compact of the invention, and at the same time, N in the BN diffuses into the $TiN_{1\pm x}$ of the matrix to fill the atomic voids of relatively small-amount of N in $TiN_{1\pm x}$. In this case, the finer the CBN powder used, the larger becomes the contact area in the $TiN_{1\pm x}$ powder, thereby promoting the above reaction at lower temperatures. According to the present invention, by the reaction at the contacting faces between $TiN_{1\pm x}$ particles and CBN, which is the hard component, there can be obtained a very hard, densely concentrated compact of which the CBN particles are strongly bonded together by the matrix of TiN crystals.

The inventors made further experiments by using $TiN_{1\pm x}$ powder materials having different values of $(1\pm x)$. As a result, it was found that the temperature conditions in which a very hard and densely concentrated compact can be obtained shift towards a higher range as the $(1\pm x)$ value becomes larger. The reason may be that the relatively excessive Ti atoms which are involved in the reaction with the CBN particles, and the atomic void degree of N decreases as the $(1\pm x)$ value becomes larger. However, when the sintering is performed by a super-pressure apparatus as in the present invention, it is more advantageous to operate the apparatus at lower temperatures since the life thereof can be increased and the reaction of the compact to the surrounding material can be reduced.

The abovementioned facts can be applied also to binder compounds such as $ZrN_{1\pm x}$, $Ti(C,N)_{1\pm x}$ besides $TiN_{1\pm x}$. The inventors made similar experiments on carbides, such as $TiC_{1\pm x}$, and $ZrC_{1\pm x}$. For example, the sole $TiC_{1\pm x}$ powder was treated under high pressures at high temperatures, resulting in no change in the lattice constant. It is possible that carbides with the same relative atomic weight as nitrides have a smaller atomic void degree. However, when a mix of CBN powder with a binder compound powder of $TiC_{1\pm x}$ which has a smaller $(1\pm x)$ value and larger atomic void degree of C is sintered under high pressures at high temperatures, $TiB_2$ is produced by the reaction of BN with a relatively excessive amount of Ti, and also N in BN diffuses to fill the atomic voids of C in the TiC to form a carbonitride of Ti, i.e., Ti(C,N).

In the compact of the invention, there are used the beforementioned heat resistance binder compounds as a matrix. However, if desired, additional metals such as Ni, Co, Fe and Cu as a third component in the matrix in addition to the above heat resistance compounds, but the latter should be the main component of the matrix. Therefore, the metal is mixed in a volume range smaller than the heat resistance compounds, preferably, from 0.1 to 20 volume % in the compact. If the metal exceeds 20%, it lowers the heat resistance and wear resistance of the compact, whereby its properties as a tool will be lost.

Further, in the compact of the invention, there may exist a slight amount of alkaline metals such as Li, alkali earth metals such as Mg, and other metals such as Pb, Sn, and Cd as impure elements.

The CBN used as the material of the compact of the invention is synthesized from hexagonal boron nitride under super-pressures. Therefore, it is possible that the CBN powder might contain hexagonal boron nitride as an impure element. Furthermore, it is possible that the CBN would be reconverted to hexagonal boron nitride by the heat the before a binder compound permeates into the clearances between the CBN particles to fill them, since the CBN particles are not isostatically subjected to outside pressures. In these cases, it is effective that the powdered material of the compact is mixed with metals which catalyze the hexagonal boron nitride to promote conversion to CBN and prevent reconversion to hexagonal boron nitride.

Along the above lines, the inventors have experimented with various catalysts, especially on Al and Si so as to confirm the effects on the above conversion. As to a method of adding Al or Si to the binder compounds, for example, to nitrides of the IVa group elements formulated as $MN_{1\pm x}$, initially, Al and/or Si is mixed in the $MN_{1\pm x}$ compound which has a $(1\pm x)$ value of less than 0.97. The mix is heated in a vacuum or an inert atmosphere at temperatures higher than 600° C. to cause the relatively excessive M metals in the $MN_{1\pm x}$ to react with the Al or Si, thereby producing intermetallic compounds existing in the range of a M vs Al or M vs Si phase diagram (if M is Ti for example, $TiAl_3$, TiAl and others). The intermetallic compounds are powdered and used as binder materials to be mixed in the CBN powder. Al and Si added by the above method uniformly disperses in the matrix, and a small amount is therefore effective.

Another method of adding Al or Si is to previously prepare M-Al and/or M-Si intermetallic compound powder and added to the binder compound. The above additive can also be mixed in a binder compound made of carbides or carbonitrides.

The effectiveness of a compact mixed with Al or Si was compared to a compact which is not added. Both of the compacts were ground and the structures thereof were examined. It was revealed that in a compact containing Al or Si, less CBN particles exfoliate from the structure at the ground face, which may be due to the greater bonding strength of the CBN particles to the matrix. Further, both of the compacts were compared as cutting tools. It was also revealed that the compact containing Al or Si is superior in both wear resistance and toughness. The effective range of Al or Si to be added is from 0.1 to 20 volume % in the compact.

Figure 6:
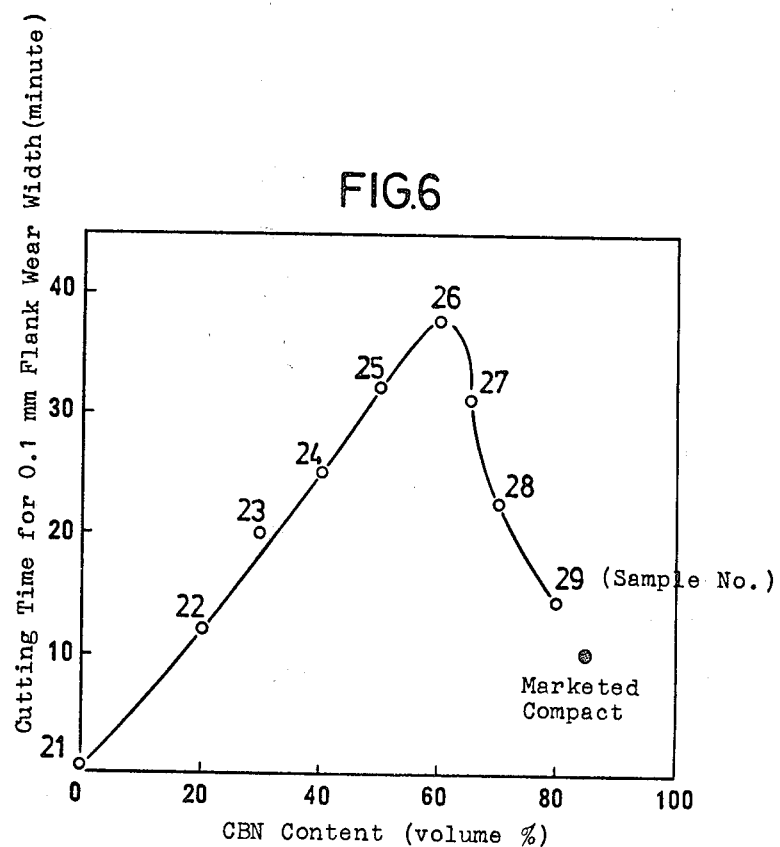
FIG. 6 is a chart showing the CBN volumes contained in a compact of this invention in relation to the time period in which the cutting tool wears down by a predetermined amount.

As mentioned before, the CBN volume ranges from 10 to 80%. However, when the compact of the invention is applied to a cutting tool, it is preferable to change the volume according to the workpiece to be cut. For example, when a hard steel, cast iron or the like having a hardness more than a HRC (Rockwell C scale) of 45 is cut, 30 to 70 volume % of CBN is preferred. FIG. 6 shows the relationship between the CBN volume and the wear resistance when a hardened steel with a hardness of HRC 60 is cut. The average particle size of CBN in the compact is 3 microns, and when Al is added in the matrix which Al-Ti intermetallic compounds are formed. In the Figure, the solid circle shows the result of test for a commercially available CBN compact using Co as a binder.

CBN has a higher hardness and abrasive wear resistance than TiN. Therefore, if a compact contains as large amount of CBN as possible, the abrasive wear resistance may be improved upon using the compact as a cutting tool for cutting a hardened steel and the like. In practice, however, when TiN is used as a binder compound as shown in FIG. 6, the compact containing 60 volume % of CBN has the highest wear resistance, and in a range over 60%, the compact exhibits lower wear resistance.

The wear of a cutting edge in practical cutting operations is generally classified into abrasive wear and chemical wear, such as adhesive wear and diffusion wear, between a cutting tool and a workpiece or oxidation wear of the a cutting tool. Against abrasive wear, CBN is superior as mentioned before, but against chemical wear, nitrides, carbons and carbonitrides of Ti, Zr, Hf and other metals used in the present invention are superior. Therefore, in the application of the compact of the present invention to a cutting tool, there may be an optimum range of composition in respect to improving the wear resistance, which is caused both by abrasive and chemical wears. The compact of the invention with a CBN volume of about 60% has a far greater wear resistance than the marketed CBN compact with the matrix mainly composed of Co and a CBN volume of about 85%. The compact of the invention with a CBN volume of less than 20% shows a wear resistance substantially equivalent to a marketed CBN compact.

Figure 7:
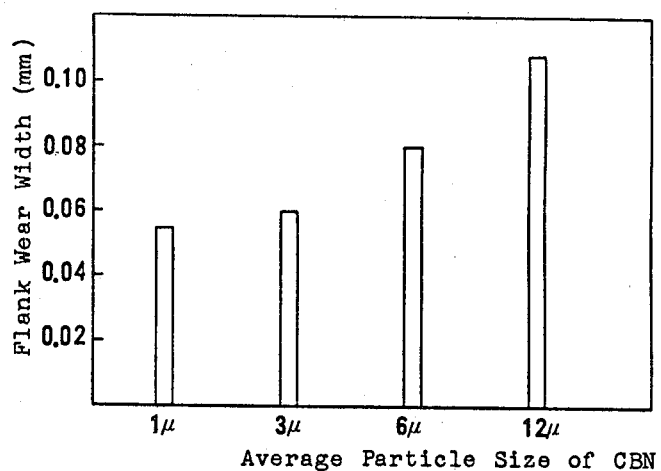
FIG. 7 is a graph showing the average particle sizes of CBN in relation to the wear width of a sintered compact obtained.

FIG. 7 shows the wear resistance of a sintered compact of the invention, which contains 60 constant volume % of CBN of which only the particle size varies. The same workpiece as in FIG. 6 is used. As evident, the finer the average particle size of CBN, the smaller the wear width. The particle size of CBN affects not only the wear resistance but also the roughness of the worked face. As a result of these tests, when coarser particles of CBN are used, the worked face becomes rougher. Upon cutting a workpiece, such as hardened steel which is heretofore machined by grinding, there necessarily arises the problem of roughness on the worked face. According to the experiments of the inventors, it was found that there occurs no problem in practical use in respect to both the wear resistance and roughness of a worked face, when the average particle size is less than 10 microns.

On the other hand, in cutting a softer steel or cast iron workpiece having a hardness below a HRC of 45, a compact containing CBN in amounts less than 40 volume % can perform adequately. In this case, the compact can be obtained at lower costs and under conditions of relatively low pressures upon sintering by a super-pressure apparatus.

Further, the roughness of the worked face can be improved. In view of these advantages, a compact having a smaller CBN volume can be rather superior in this case.

In using the compact of the invention as a cutter, a compact comprising CBN and heat-resistance binder can be brazed directly to a steel support in a tool or to a corner of a throw-away tip. As is known, CBN itself has poor adhesiveness or wettability in respect to a usual silver or copper solder. Therefore, the greater the CBN volume in the compact, the more difficult is the brazing. In the compact of the invention, the CBN volume is more than 10% and less than 80%. Further, the binder is mainly composed a carbide, nitride, carbonitride, boride or silicide of IVa, Va and VIa group metals of the periodic table, which form a continuous matrix in the structure of the compact. This matrix has a better wettability to a silver or copper solder. Therefore, the compact of the invention can be brazed in the usual manner. However, in the use of the compact of the invention as a cutting tool, it is enough that the edge of the tool contains a hard and wear resistance layer containing CBN. Therefore, it is more advantageous to form a complex compact which comprises a CBN hard layer and a cemented carbide substrate integral with the former, in view of the cost and the strength of the tool. The thickness of the hard layer in the complex compact varies according to the operating conditions of the cutting tool as well as the shape thereof, but is generally more than 0.5 mm which is enough for attaining the object of the present invention.

For a cemented carbide substrate, a WC cemented carbide is most preferable since it has a high hardness, heat conductivity and toughness.

The method of producing this complex compact is as follows: There is previously prepared a substrate alloy of a suitable shape from a cemented carbide. A powder mix or the green compact of a heat resistance binder compound and a CBN powder for forming a hard layer as an effective cutting edge is put on the substrate. The assembly is hot-pressed by a super-pressure apparatus to sinter the hard layer and at the same time to bond to the cemented carbide substrate. At this time, a binder metal such as Co contained in the cemented carbide substrate dissolves at temperatures over the liquid phase appearing point during hot-pressing. When the amount of CBN in the material for forming the hard layer is greater than the compact of the invention, for example, when almost all the material consists of CBN, the liquid phase of the cemented carbide substrate permeates into the clearances between CBN particles, since the CBN particles have a very high rigidity and is difficult to deform even under super-pressures so that the clearances still remain. The compact of the invention has its matrix mainly composed of carbides, nitrides, carbonitrides, borides and silicides of IVa, Va and VIa group metals which form a continuous matrix in the compact. These binder compounds have a lower rigidity than CBN, and more easily deform under super-pressures to form a densely compacted powder body before the appearance of the liquid phase. As a result, in the compact of the invention, there will not occur any permeation of the liquid phase of the cemented carbide substrate during hot-pressing under super-pressures, which permeation may cause the composition of the hard layer to vary and the heat-resistance thereof to lower. Further, as understood from the fact that carbides, nitrides and carbonitrides of IVa, Va and VIa group metals selected as are selected as especially preferably binder materials as hard, heat resistance components in conventional cemented carbides or cermets, these IVa, Va and VIa group metals have a high affinity to iron group metals such as Co used as the binder metals of cemented carbides. The compact of the invention has, therefore, a strong adhesiveness to a cemented carbide substrate at the interface of adhesion, since these binder compounds such as TiN form a continuous matrix in the compact of the invention.

Now, the above description mainly relates to CBN. However, high pressure form boron nitride includes not only CBN but also the beforementioned wBN, to which the present invention can also be applied.

Wurtzite boron nitride is produced from hexagonal boron nitride by a dynamic super-pressure generating method using shock waves. This method has an advantage in that the material can be obtained at a lower cost as compared to CBN which is produced by a static super-pressure apparatus. In the synthesizing method of using shock waves, high pressures and temperatures are kept for shorter periods. As a result, the time for the crystal growth is limited, and the particle size of thus obtained wBN is usually finer than 10 microns. Further, the particle is of complicated shape having fine projections and recesses in the surface, resulting in a larger surface area. Therefore, even by the previous heat-treatment for degassing, there remains a large amount of gas components which lowers the physical properties of the compact.

In order to obtain a densely concentrated compact, therefore, it is effective to employ a binder compound with the beforementioned $(1\pm x)$ value less than 0.97, preferably, less than 0.8, which compound is generally formulated as $MN_{1\pm x}$, $MC_{1\pm x}$ and $M(C,N)_{1\pm x}$. Usually, the amount of oxides adsorbed in the wBN powder is larger than that in CBN powder due to the abovementioned reason. Therefore, when these binder compounds are used, the matrix in the compact absorbs oxygen, which is produced by the decomposition of oxides in the wBN powder, and which dissolves into the atomic voids of C or N in the binder compounds, thus producing solid solution compounds of M-C-O, M-N-O and M-C-N-O. If $TiN_{1\pm x}$ is used as a binder compound, it produces Ti(N,O) in the compact.

Further, since wBN used as a material of the compact is produced from hexagonal boron nitride by the shock wave method, there may exist hexagonal boron nitride as impurities in the in wBN powder. Still further, upon sintering under super-pressures, wBN may reconvert to hexagonal boron nitride by the heat, since wBN particles are not isostatically subjected to pressures before the binder compounds permeate into the clearances between the wBN particles. In these situations, if Al, Si and other catalyst metals are added, they serve well to prevent the reconversion of wBN and to promote conversion of the remaining hexagonal boron nitride.

Figure 8:
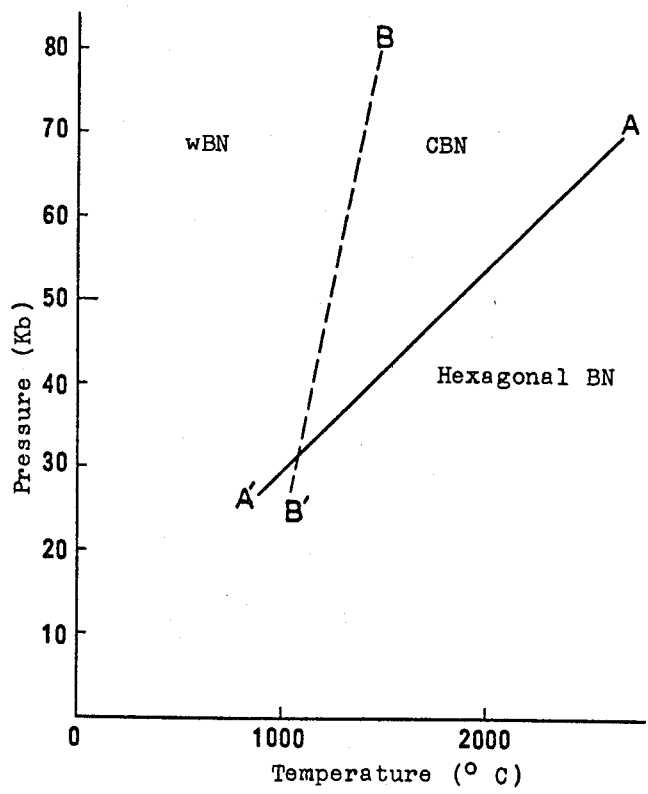
FIG. 8 is a pressure vs temperature chart of wBN showing a metastable range thereof.

In FIG. 8, the line B-B' shows the metastable region of wBN. It is known that wBN can transform to CBN under pressures at temperatures in the range defined by the B-B' and A-A' lines. Upon producing the compact of the invention, a part or whole of wBN can be transformed to CBN by sintering under conditions defined by the above range. At this time, it is also effective to add the above-mentioned catalyst metals.

Further, a mix of wBN and CBN powder can be used as a material in producing the compact of the invention.

Since the sintered compact of the present invention as described above has a high hardness, toughness, heat-resistance, and wear resistance, the compact can be used in various tools such as a wire drawing die, a peeling die, and drill bit or the like other than a cutting tool.

The present invention is illustrated by the following examples.

EXAMPLE 1

CBN powder of 7 microns in average particle size and $TiN_{0.92}$ powder of 1 micron in average particle size were thoroughly mixed in a volume ratio of 60:40 in a mortar. The powder mixture, after the addition of 2 weight % of camphor based on the total weight thereto, was formed into a green compact of 10 mm in outside diameter and 1.5 mm in height. The green compact was placed in a stainless-steel capsule, the capsule was heated at 1100° C. for 20 minutes in vacuum of $10^{-4}$ mm Hg for degassing in a vacuum furnace. The capsule was placed in a super-pressure apparatus of a girdle type using pyrophyllite as a pressure medium and a graphite tube as a heater. Between the sample and heater was filled sodium chloride. At first, the pressure was raised to 55 Kb and then the temperature to 1400° C. After being raised for 30 minutes, the temperature was lowered and the pressure was gradually released, to produce a sintered compact of about 10 mm in outside diameter and about 1 mm in thickness.

The sintered compact thus obtained was ground with a diamond wheel to make a flat face, which was further polished with a diamond paste. FIG. 3 shows an optical microphotograph of the polished face, in which the black particles are CBN crystals and the residue around the crystals is filled with TiN. As a result of an X-ray diffraction, there was detected a small amount of $TiB_2$ besides CBN and TiN. The average hardness of the sintered compact was 3200 Kg/mm² as measured by a micro-Vickers durometer.

The sintered compact was cut with a diamond cutter into a cutting tip. The tip was brazed to a steel substrate. For the purpose of comparison, two conventional cutting tools were made; one was made from a marketed CBN sintered compact which was prepared from CBN powder of 3 microns in average particle size bonded with metal cobalt, and the other was made from a cemented carbide of JIS (Japanese Industrial Standard) K01, both having the same shapes as the the sintered compact tool of the invention. As cutting tests, a JIS SNCM9 steel of HRC 54 after heat treatment was cut by the tools under conditions of 120 m/min cutting speed, 0.2 mm depth of cut and 0.12 mm/revolution feed. The cutting tool of the cemented alloy of the invention was capable of 35 minutes of continuous cutting before the flank wear width of the edge of the tool reached 0.2 mm, while the tool of the marketed CBN sintered compact bonded with metal cobalt cut the material only for 5 minutes before the wear width reached 0.2 mm. That is, the cutting tool according to the invention has a life seven times longer than a conventional tool. In the case of the cutting tool of the marketed cemented carbide of JIS K01, the wear width reached 0.38 mm in one minute and a half.

EXAMPLE 2

CBN powder of 4 microns in average particle size and $Ti(C_{0.5}, N_{0.4})_{0.90}$ powder of 1 micron in average particle size were mixed in a volume ratio of 70:30, and formed into a sintered compact of the invention in the same manner as Example 1.

The sintered compact was ground with a diamond wheel and brazed to the edge of a cemented carbide tip for milling.

For the purpose of a cutting test, a JIS FC25 casting of 80 mm in width and 300 mm in length was cut longitudinally in a face mill using a water soluble cutting oil under such conditions that the cutting speed was 500 m/min the depth was 1 mm and the feed was 2800 mm/min feed. According to the cutting tool of the invention, 500 passes could be cut. Contrary to this, when a conventional ceramic cutting tool was used, which was made by hot-pressing $Al_2O_3$ containing 30 weight % of TiC, a cutting of 20 passes resulted in chipping of the edge due to thermal cracking. Similarly, when a marketed ceramic cutting tool was used, which was made from $Al_2O_3$ containing 0.5 weight % of MgO, a cutting of only 2 passes resulted in the chipping of the edge due to thermal cracking.

EXAMPLE 3

CBN powder of 4 microns in average particle size was mixed with one of the powders of a binder compounds in the volume ratio tabulated in Table 1, and was formed into a green compact in the same way as Example 1.

TABLE 1

| Sample | CBN (vol. %) | Binder Compounds Composition | (vol. %) | Pressure (Kb) | Temp. (°C.) |
|---|---|---|---|---|---|
| 1 | 60 | $TiC_{0.97}$ | 40 | 55 | 1500 |
| 2 | 80 | $TiN_{0.73}$ | 20 | 55 | 1300 |
| 3 | 40 | $TiN_{0.73}$ | 60 | 40 | 1100 |
| 4 | 60 | $ZrN_{0.89}$ | 40 | 60 | 1300 |
| 5 | 70 | WC | 30 | 60 | 1400 |
| 6 | 60 | $VN_{0.75}$ | 40 | 60 | 1600 |
| 7 | 60 | $ZrB_2$ | 40 | 65 | 1600 |

An individual green compact was placed in a molybdenum capsule, and in the same manner as Example 1, the compact was pretreated, and sintered by means of a super-pressure apparatus under the conditions given in Table 1, holding the temperature for 20 minutes, to produce a sintered compact of the invention having a densely concentrated structure.

EXAMPLE 4

A mixture of CBN powder of 7 microns in average particle size and one of the binder compounds as listed in Table 2 in a volume ratio of 60:40 was put in a molybdenum capsule and was formed into a green compact in the same way as Example 1 under the conditions also listed in Table 2.

The observation of the structure of the sintered compact polished with a diamond paste as well as by an X-ray diffraction of the matrix or the binder material revealed that Sample 8 comprised TiN as a major part and very likely a small proportion of $Ti_2AlN$, TiAl and $TiAl_3$, whereas Sample 9 contained a small proportion of $Ti_2Ni$ or TiNi compound dispersed in the matrix in addition to TiN. It was also observed that the matrix of Sample 10 comprised TiC and metal nickel. Similarly, the matrix of Sample 11 was found to have TiFe and $TiFe_2$ besides TiN, and the matrix of Sample 12 was found to have TiCu and $Ti_2Cu$ besides TiN. The matrix of Sample 13 comprised TiN, $TiSi_2$ and TiSi.

TABLE 2

| Sample | Binder Compound (vol. %) | | | | Pressure (Kb) | Temp. (°C.) |
|---|---|---|---|---|---|---|
| 8 | $TiN_{0.73}$ | 35%, | $Al_3Ti$ | 5% | 40 | 1100 |
| 9 | $TiN_{0.73}$ | 38%, | Ni | 2% | 40 | 1200 |
| 10 | $TiC_{0.97}$ | 20%, | Ni | 20% | 40 | 1200 |
| 11 | $TiN_{0.73}$ | 35%, | Fe | 5% | 40 | 1200 |
| 12 | $TiN_{0.73}$ | 38%, | Cu | 2% | 40 | 1200 |
| 13 | $TiN_{0.73}$ | 35%, | Si | 5% | 40 | 1200 |

EXAMPLE 5

$TiN_{0.73}$ powder of 1 micron in average particle size was mixed with aluminum powder of 30 microns in average particle size in a weight ratio of 90:10 by means of a blender. The powder mixture was formed into a green compact in the form of pellet under a pressure of 1 tons/cm$^2$, and heated and maintained at 1000° C. for 30 minutes in a vacuum furnace. The resultant sintered compact was crushed to a powder. The X-ray diffraction of the powder provided peaks which were possibly attributable to $TiAl_3$, TiAl and $Ti_2AlN$ besides the peaks for TiN, but metal aluminum was not detected.

The above TiN powder containing the aluminum compounds and CBN powder of 7 micron in average particle size were mixed together in a volume ratio of 40:60 to form a green compact in a molybdenum capsule, and sintered to a compact of 7 mm in outside diameter, and 3.5 mm in height, as in Example 1.

The sintered compact was formed into a wire drawing die with holes of 1.0 mm in diameter in the same manner as in a diamond wire drawing die. For the purpose of comparison, two conventional dies of the same shape as the above were made; one from a marketed cemented carbide and the other from a sintered diamond compact which was prepared from a diamond powder bonded with metal cobalt. By the use of these dies were drawn tungsten wires being preheated at about 800° C. The die according to the invention was able to draw 3 tons, while the die of the marketed cemented carbide wore out when 200 Kg of the tungsten was drawn, and the die of the diamond sintered compact wore out when 1 ton was drawn.

EXAMPLE 6

$Ti(C_{0.4}, N_{0.4})_{0.8}$ powder of 1 micron in average particle size was mixed with aluminum powder of 30 microns in the average particle size in a weight ratio of 98:2 to produce a Ti(C, N) powder mixture containing aluminum compounds in the same way as Example 5. The powder mixture was then mixed with CBN powder of 4 microns in average particle size in a volume ratio of 65:35. A sintered compact of the invention was prepared from the above mixture in the same manner as Example 1, except that the pressure was 50 Kb and the temperature was 1150° C. in sintering.

Figure 9:
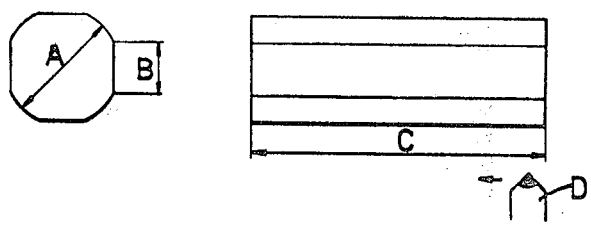
FIG. 9 is a diagram illustrating the shape of a workpiece.

A cutting tool was made from the sintered compact in the same manner as Example 1, and put in a cutting test to cut a heat-treated JIS SCr3 steel having the shape shown in FIG. 9, in which A is 32 mm in diameter, B and C are 12 mm and 196 mm in length, respectively, and the arrow shows the cutting direction of a tip D, under the conditions of a cutting speed of 60 m/min, a cutting depth of 0.15 mm and a feed of 0.12 mm/revolution. The test revealed that the cutting tool was still able to be used after it cut 20 steel materials. For comparison, a marketed cutting tool was tested in the same way as above, which was prepared from a CBN sintered compact of CBN bonded with a metal cobalt, and was found to be damaged at the blade edge when only one material was cut.

EXAMPLE 7

Powders of CBN of 4 microns in average particle size, and $TiN_{0.92}$, $TiSi_2$ and nickel carbonyl, each of 1 micron in average particle size were mixed together in a volume ratio of 70:15:5:10 and formed into a sintered compact in the same manner as Example 1. There were detected TiSi, $TiSi_2$ and $Ti_2Ni$ in addition to CBN and TiN in the sintered compact by X-ray diffraction.

Figure 10:
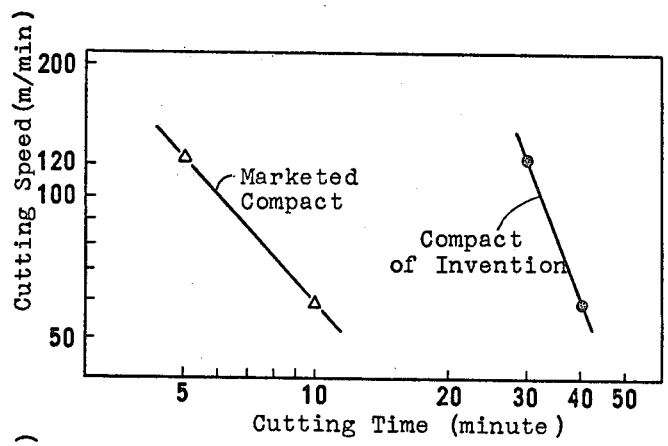
FIG. 10 is a chart showing the wear resistance of a cutting tool having the sintered compacts of the invention.

The sintered compact was formed into a cutting tip, with which a JIS SNCM9 steel of 54 HRC was cut under the same conditions as Example 1, except that the cutting speed changed. For comparison, the cutting tool used in Example 1 of a marketed CBN sintered compact was tested in the same way as above. FIG. 10 shows the time required to produce a flank wear width of 0.2 mm versus a cutting speed. It is evident that the sintered compact of the invention has excellent wear resistance especially in high speed cutting operations.

EXAMPLE 8

A mixture of CBN powder of 4 microns in average particle size and one of the binder compounds in the volume ratio tabulated in Table 3 was formed into a green compact in the same manner as Example 1.

TABLE 3

| Samples | CBN (vol. %) | Binder Compounds Compositions | Binder Compounds (vol. %) | Pressure (Kb) | Temp. (°C.) |
|---|---|---|---|---|---|
| 14 | 35 | $TiC_{0.97}$ | 65 | 50 | 1500 |
| 15 | 30 | $TiN_{0.73}$ | 70 | 40 | 1300 |
| 16 | 15 | $TiN_{0.73}$ | 85 | 30 | 1100 |
| 17 | 35 | $ZrN_{0.89}$ | 65 | 50 | 1350 |
| 18 | 35 | WC | 65 | 50 | 1400 |
| 19 | 35 | $TaC_{0.92}$ | 65 | 50 | 1600 |
| 20 | 35 | $ZrB_2$ | 65 | 55 | 1600 |

The green compact was then placed in a molybdenum capsule, and after being preheated, was sintered by means of a super-pressure apparatus under the conditions tabulated in Table 3 with the temperature maintained for 20 minutes in sintering, as in Example 1.

The sintered compacts as listed above was densely concentrated. A cutting tip was made from Sample 14, Sample 15 or Sample 16 obtained above, and for comparison, two cutting tools were formed from a sintered compact of $TiN_{0.90}$ powder hot-pressed at 1700° C. for 15 minutes under 200 Kg/cm², and from a JIS P10 cemented carbide, respectively. Cutting tests were performed under the conditions of a cutting speed of 150 m/min, a cutting depth of 0.5 mm and a feed of 0.1 mm/revolution on a JIS S45C thermally refined rod to examine the roughness of the worked face. All the cutting tools tested had an edge with the radius of 0.8 mm. When the cutting tool of Samples 14, 15 or 16 according to the present invention was used, the roughness of the worked face ranged from 2 to 3 microns, but when the cutting tools of the sintered compact consisting only of TiN and of the conventional cemented carbide corresponding to JIS P10, the roughness was in the range of 4 to 6 microns and 6 to 12 microns, respectively.

EXAMPLE 9

$TiN_{0.73}$ powder ball-milled by cemented carbide balls into 1 micron in average particle was mixed with aluminum powder of 30 microns in average particle size in a weight ratio of 90:10 in a blender, and was formed into a green compact in the form of a tablet under a pressure of 1 tons/cm². This was then heated at 1000° C. for 30 minutes in a vacuum furnace to produce a sintered compact of the invention. The sintered compact was crushed into a powder for X-ray diffraction, which exhibited peaks that are likely corresponding to $TiAl_2$, TiAl and $Ti_2AlN$ besides the peaks due to TiN, but no peak attributable to metal aluminum.

TABLE 4

| Samples | CBN (vol. %) | TiN—Al Compd. (vol. %) |
|---|---|---|
| 21 | 0 | 100 |
| 22 | 20 | 80 |
| 23 | 30 | 70 |
| 24 | 40 | 60 |
| 25 | 50 | 50 |
| 26 | 60 | 40 |
| 27 | 65 | 35 |
| 28 | 70 | 30 |
| 29 | 80 | 20 |

The above TiN powder containing the aluminum compounds was mixed with CBN powder of 3 microns in average particle size in varied volume ratios as tabulated in Table 4.

To the powder mixture was added 2 weight % of camphor on the basis of the total weight, and there was formed a green compact of 10 mm in outside diameter and 1.5 mm in height. The green compact was placed in a stainless-steel capsule and heated at 1100° C. for 20 minutes in vacuum of $10^{-4}$ mm Hg for degassing thereof in a vacuum furnace. The capsule was put in a girdle type super-pressure apparatus using pyrophyllite as a pressure medium and a graphite tube as a heater with the gap between the sample and the heater filled with sodium chloride. At first, the pressure was increased to 55 Kb, then the temperature was raised to 1100° C. After 20 minutes, the temperature was lowered and the pressure was gradually released, providing a sintered compact of the invention of about 10 mm in outside diameter and about 1 mm in height.

The sintered compact was ground with a diamond wheel so as to have a plane, and was cut to a cutting tip by the use of a diamond cutter. The cutting tip was brazed to a steel substrate, producing a cutting tool according to the invention. For the purpose of comparison, two conventional cutting tools were made; one from a marketed CBN sintered compact of CBN powder of 3 microns in average particle size bonded with metal cobalt, and the other from a JIS K01 cemented carbide, both having the same shape as the tool of the invention.

Cutting tests were conducted on these cutting tools under conditions of 150 m/min cutting speed, 0.2 mm depth of cut and 0.12 mm/revolution feed, wherein a hardened SNCM9 steel of HRC 60 was used as a test workpiece. The time required for the flank wear width of each cutting tool to reach 0.1 mm is shown in FIG. 6. Evidently, the cutting tool of the sintered compact of the invention has a life twice as long as that of the conventional tool of the marketed sintered compact prepared from CBN powder bonded with metal cobalt, and in particular, Sample 26 showed the best performance among Samples 21 to 29 showing a wear resistance three times longer than that of the conventional tool.

EXAMPLE 10

The same CBN powder and the same TiN powder containing aluminum compounds as those described in Example 9 were mixed in a volume ratio corresponding to that of Sample 26 to form a green compact in the form of pellet of 10 mm in outside diameter and 1.5 mm in thickness. Separately, a disk substrate was formed, which was made of a WC-6% Co cemented carbide, of 10 mm in outside diameter and 3 mm in thickness.

The substrate was placed in a stainless-steel capsule with the pellet put thereon. The capsule was degassed in vacuo in the same way as Example 9. After degassing, the green compact with the substrate was hot-pressed at 1100° C. under 55 Kb for 20 minutes by the use of a super-pressure apparatus to form a complex compact of the invention. In the sintered complex compact thus obtained, a layer of the sintered compact containing CBN and of about 10 mm in outside diameter and 1.5 mm in thickness was firmly bonded with the WC-6% Co cemented carbide substrate.

The complex compact was ground with a diamond wheel to form a cutting tip in the form of disk and was fitted to a steel substrate. A chilled casting roll of JIS HRC 56 and of 735 mm and 650 mm in outside diameter and width, respectively, was chosen as a workpiece for a cutting test. For comparison, another cutting test was made on three cutting tips; the first from a marketed CBN sintered compact bonded with metal cobalt, the second from $Al_2O_3$ ceramics containing TiC, and the third from a cemented carbide corresponding to JIS KO1. The cutting condition were selected for an individual cutting tool so as to be fit to the tool, as given in Table 5 together with the test results. The tip of the sintered complex compact according to the present invention was not damaged, and showed a performance 50 times better than a KO1 cemented carbide tip.

TABLE 5

| Tool Material | Cutting Speeds (m/min) | Depth of Cut (mm) | Feed (mm/rev.) | Observation |
|---|---|---|---|---|
| CBN[a] | 60 | 1.5 | 1.0 | No damage after cutting 10 workpieces |
| CBN[b] | 60 | 1.5 | 1.0 | Damaged in cutting one workpiece. |
| $Al_2O_3$—TiC ceramics | 30 | 1.5 | 1.0 | Damaged at the beginning of cutting |
| KO1 carbide | 9 | 2 | 1.0 | Damaged in cutting the first 1/5 of workpiece. |

[a]Sintered compact of the invention.
[b]Sintered compact of marketed CBN bonded with metal cobalt.

EXAMPLE 11

A powder of wBN containing 0.7 weight % of oxygen and which is smaller than 2 microns in average particle size, prepared by a so-called shock wave method, was mixed with $TiN_{0.8}$ powder of 1 micron in average particle size containing 18.1 weight % of nitrogen in a volume ratio of 60:40 utilizing acetone as a solvent in a ball mill for 48 hours. The powder mixture was formed into a green compact of 10 mm in outside diameter and 1.5 mm in thickness, and then placed in an iron capsule in the form of cylinder provided a bottom therewith. The capsule was put in a vacuum furnace and heated at 700° C. for 20 minutes in a vacuum of $10^{-5}$ mm Hg so as to dagas it.

The degassed product was charged in a belt type super-pressure apparatus with pyrophyllite as a pressure medium and a graphite tube as a heater, the gap between the sample and the heater being filled with sodium chloride. The pressure was at first raised to 55 Kb, and then the temperature was raised to and kept at 1200° C. for 30 minutes. After that, the temperature was lowered, and the pressure was gradually released, to provide a sintered compact of the invention.

The sintered compact thus obtained, after ground with a diamond wheel, was finished by lapping with a diamond paste. The Vickers hardness of the lapped surface of the compact was 4000 Kg/mm². The X-ray diffraction of the lapped surface exhibited weak peaks attributable to $TiB_2$ besides the peaks according to wBN and a solid solution of Ti(N, O).

EXAMPLE 12

A powder mixture of the same wBN as that used in Example 11 and $TiN_{0.8}$ powder was formed into a green compact. Separately, a disk substrate of 10 mm in outside diameter and 3 mm in thickness was prepared from a cemented carbide that was sintered in advance, of a composition of WC-6% Co. The substrate was placed in an iron capsule in the form of cylinder having a bottom and the green compact was put on the disk. Then, in the same way as Example 11, a sintered compact was produced, in which a layer about 1 mm thick of a hard sintered compact was firmly bonded with the disk of cemented carbide previously mentioned.

The complex compact was cut out with a diamond cutter to divide it in two, and the section was studied by a X-ray micro-analyzer, revealing that, at the interface between the hard sintered compact containing wBN and the substrate, the cobalt in the substrate had not diffused into the layer of the sintered compact.

The complex sintered compact comprising the hard sintered compact bonded with the cemented carbide was brazed to a steel substrate to make a cutting tool. The cutting tool was tested using a hardened JIS SNCM9 steel of HRC 57 as a test workpiece. The flank wear width of the tool reached 0.20 mm after the cutting operation was continued for as long as 40 minutes under the conditions such that the cutting speed is 90 m/min, the cutting depth is 0.2 mm and the feed was 0.04 mm/revolution, said cutting taking place in the presence of a water soluble cutting oil. Moreover, a longer period of cutting was possible according to the cutting tool of the invention. On the contray, a wear width more than 0.20 mm was reached in two minutes, when a cutting tool of JIS KO1 cemented carbide, one of the hardest materials available, was used, and cutting could not be continued any longer.

EXAMPLE 13

Powder of wBN smaller than 4 microns in average particle size containing 0.4 weight % of oxygen was mixed with $TiC_{0.95}$ powder of 1 micron in average particle size containing 19.2 weight % of carbon in a volume ratio of 80:20 in a ball mill using acetone as a solvent, and was formed into a green compact by application of a pressure of 2 tons/cm². The green compact was then formed into a sintered compact of the invention in the same way as Example 11 except that the pressure was 55 Kb and the sintering temperature was 1150° C.

The X-ray diffraction of the sintered compact exhibited peaks attributable to wBN and CBN in addition to the peaks based on a Ti-C-O solid solution. The Vickers hardness of the compact was 5000 Kg/mm².

EXAMPLE 14

The same wBN powder as that used in Example 12 was mixed with one of the binder compounds as listed in Table 6 in a volume ratio also listed in the table, and was formed into a sintered compact of a dense structure under the conditions given in the table, while holding the temperature and pressure thereat for 30 minutes in the same way as Example 11. The hardness of the compact were measured and tabulated in Table 6.

TABLE 6

| Sample | Binder Compound Composition | (vol. %) | Pressure (Kb) | Temp. (°C.) | Hardness (Kg/mm²) |
|---|---|---|---|---|---|
| 30 | $ZrN_{0.89}$ | 50 | 50 | 1300 | 3000 |
| 31 | $HfN_{0.90}$ | 50 | 50 | 1300 | 3100 |
| 32 | $Ti(C,N)^{(a)}$ | 40 | 55 | 1400 | 3700 |
| 33 | $Ti(C,N)^{(b)}$ | 40 | 55 | 1400 | 3400 |
| 34 | $VC_{0.80}$ | 20 | 60 | 1500 | 4200 |
| 35 | $NbC_{0.85}$ | 20 | 60 | 1500 | 4200 |
| 36 | $(Ti,Ta)N^{(c)}$ | 20 | 55 | 1400 | 4500 |
| 37 | $(Ti,Mo)C^{(d)}$ | 30 | 55 | 1400 | 4000 |
| 38 | $(Ti,W)C^{(e)}$ | 30 | 55 | 1400 | 4000 |
| 39 | $(Ti,Ta)(C,N)^{(f)}$ | 30 | 55 | 1400 | 3700 |

$^{(a)}Ti(C_{0.80}, N_{0.15})_{0.95}$
$^{(b)}Ti(C_{0.5}, N_{0.3})_{0.8}$
$^{(c)}(Ti_{0.7}, Ta_{0.3})N_{0.9}$
$^{(d)}(Ti_{0.9}, Mo_{0.1})C_{0.9}$
$^{(e)}(Ti_{0.9}, W_{0.1})C_{0.9}$
$^{(f)}(Ti_{0.8}, Ta_{0.2})(C_{0.5}, N_{0.4})_{0.9}$

EXAMPLE 15

The same wBN powder as that used in Example 13 was mixed with $TiC_{0.95}$ powder in the volume ratios listed in Table 7.

TABLE 7

| Sample | wBN (vol. %) | Pressure (Kb) | Temp. (°C.) | Hardness (Kg/mm²) |
|---|---|---|---|---|
| 40 | 20 | 60 | 1400 | 3100 |
| 41 | 30 | 60 | 1400 | 3200 |
| 42 | 40 | 60 | 1400 | 3500 |
| 43 | 50 | 60 | 1500 | 3800 |
| 44 | 60 | 60 | 1500 | 4500 |
| 45 | 70 | 60 | 1500 | 4900 |
| 46 | 80 | 60 | 1600 | 5300 |
| 47 | 90 | 60 | 1600 | 6000 |

Figure 11:
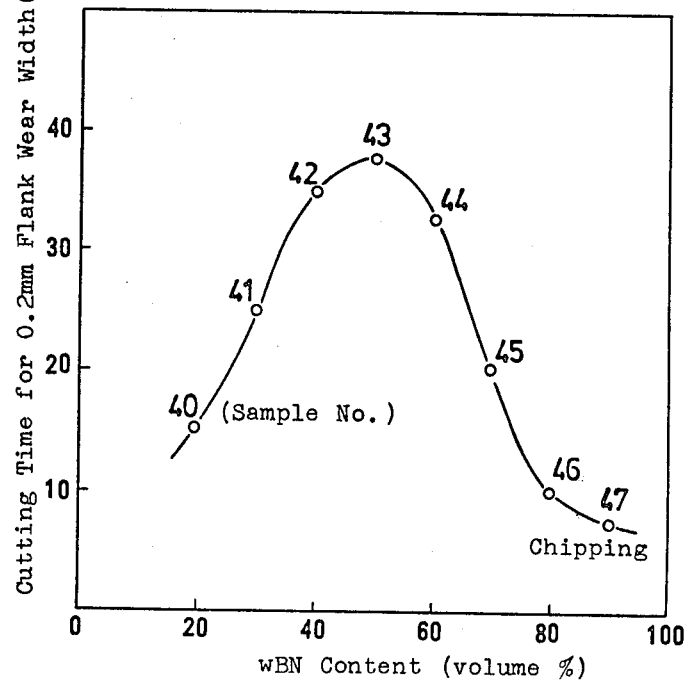
FIG. 11 is a chart showing the wBN amount in a sintered compact of the invention in relation to the time period in which a cutting tool wears down to a predetermined amount.

The mixture was sintered at the temperature and pressure given in the table for 30 minutes in the same way as Example 13. An individual sintered compact of the invention was cut to form into a cutting tip, which was brazed to a steel substrate to make a bite. As a cutting test, a hardened JIS SNCM9 steel of HRC 57 was cut under the conditions such that the cutting speed was 150 m/min, the cutting depth was 0.2 mm and the feed was 0.12 mm/revolution. The time required for the flank wear width of the cutting tool to reach 0.2 mm with regard to Samples 40 to 47 is shown in FIG. 11. Among the Samples tested, Samples 42 and 43 showed the highest wear resistance, while the blade edge from Sample 47 was chipped in the cutting operation.

EXAMPLE 16

A green compact was prepared from a mixture of wBN powder smaller than 2 microns in average particle size and $VN_{0.5}$ powder of 0.5 micron in average particle size in a volume ratio of 40:60.

A disk substrate of 10 mm in outside diameter and 3 mm in thickness was separately prepared from sintered WC-6% Co cemented carbide, and was placed in a stainless-steel capsule with a bottom. Then, the green compact was put on the disk substrate in contact therewith. The capsule was heated at 800° C. for 20 minutes under $10^{-4}$ mm Hg in a vacuum furnace to degas thereof. The capsule was charged in a girdle type super-pressure apparatus utilizing pyrophyllite as a pressure medium and a graphite tube as a heater. Between the sample and the heater was filled sodium chloride. At first, the pressure was raised to 55 Kb and then the temperature to 1300° C. After 30 minutes, the temperature was lowered and the pressure gradually released.

The complex compact thus obtained had a structure in which a layer of about 1 mm in thickness of the sintered compact containing wBN was firmly bonded with the cemented carbide disk.

The complex compact was cut out and divided in two to examine the sections thereof. The X-ray analysis revealed no diffusion of the cobalt in the cemented carbide disk into the layer of the sintered compact.

EXAMPLE 17

CBN powder each of 1 microns, 3 micron and 5 microns in average particle size, and $TiN_{0.72}$ powder of 1 micron in average particle size were mixed together in a volume ratio of 60:40. After the addition of 2 weight % of camphor thereto, based on the total weight, the mixture was formed into a green compact of 10 mm in outside diameter and 1.5 mm in height. The green compact was then placed in a stainless-steel capsule, which was then heated at 1100° C. under $10^{-4}$ mm Hg for 20 minutes for degassing thereof. The capsule was put in a girdle type super-pressure apparatus using pyrophyllite as a pressure medium and a graphite tube as a heater. The gap between the sample and the heater was filled with sodium chloride. At first, the pressure was raised to 55 Kb, and then the temperature to a point between 900° to 1400° C. After the maintenance of the temperature and pressure for 20 minutes, the temperature was lowered, and the pressure was gradually released.

A face of the individual sintered compact thus obtained was ground with a diamond wheel, and further polished with a diamond paste. Based on the X-ray diffraction on the polished face using Si as a standard, the lattice constant of the (422) plane of TiN was measured for each Sample. FIG. 4 shows the results on the sintered compacts produced at various temperatures from CBN powders which differ in particle size. At the same time, the sample was examined to see whether $TiB_2$ was formed in the sintering. When CBN powder of 5 microns in average particle size was sintered at 1200° C. or 1440° C., $TiB_2$ was formed. Also when CBN powder of 3 micron in the average particle size was sintered at 1100° C., $TiB_2$ was formed.

For comparison, only $TiN_{0.72}$ powder was sintered respectively at 800° C., 1000° C. and 1200° C. under 55 Kb for 20 minutes in the same way as above, to examine the lattice constants. The results are shown in FIG. 4.

EXAMPLE 18

CBN powder of 5 microns in average particle size and a powder either of $ZrN_{0.89}$ containing 12.0 weight % of nitrogen or of $ZrN_{0.79}$ containing 10.8 weight % of nitrogen, each of 1 micron in average particle size, were mixed in a volume ratio of 60:40. The lattice constants of $ZrN_{0.89}$ and $ZrN_{0.79}$ of the materials used in this Example, were measured to be 4.579 Å and 4.582 Å at the (333)plane of ZrN, respectively, based on the X-ray diffraction.

The above powder mixtures were sintered either at 1150° C. or at 1350° C. under a pressure of 55 Kb, as in Example 17. $ZrN_{0.89}$ failed to give a sufficiently dense structure when sintered at 1150° C., whereas $ZrN_{0.79}$ successfully gave a sintered compact of a dense structure when sintered at the same temperature as above.

The lattice constants of the ZrN in the sintered compacts were measured in the same way as Example 17. When sintered at 1350° C., the lattice constant was 4.605 Å, irrespective of the materials. When $ZrN_{0.79}$ was used as a material and sintered at 1150° C., the lattice constant was found to be 4.600 Å.

EXAMPLE 19

Powder of wBN smaller than 4 microns in average particle size, prepared from shock wave method, was mixed with a binder compound in a volume ratio as listed in Table 8, and the powder mixture was sintered at 1300° C. for 20 minutes under a high pressure of 50 Kb to produce a sintered compact of the invention with a dense structure in the same way as Example 17. The lattice constants measured for the binder compounds and those in the sintered compacts are tabulated in Table 8.

TABLE 8

| BN (vol. %) | Binder Compound | TiN Lattice Binder Compd. (Å) | Constant of Sintered Compact (Å) |
|---|---|---|---|
| 30 | $Ti(C_{0.5}, N_{0.3})_{0.8}$ | 4.285 | 4.295 |
| 50 | $(Ti_{0.9}, Ta_{0.1})N_{0.8}$ | 4.233 | 4.270 |
| 70 | $Ti(C_{0.5}, N_{0.5})_{0.8}$ | 4.250 | 4.265 |

EXAMPLE 20

Using the same wBN powder as that used in Example 19, powder mixtures of the composition listed in Table 9 were prepared.

TABLE 9

| BN (vol. %) | Binder Compound | TiN Lattice Binder Compd. (Å) | Constant of Sintered Compact (Å) |
|---|---|---|---|
| 60 | $TiN_{0.72}$ + 10 wt. % Al | 4.232 | 4.253 |
| 60 | $TiN_{0.72}$ + 5 wt. % Ni | 4.232 | 4.253 |
| 60 | $TiN_{0.72}$ + 5 wt. % Cu | 4.232 | 4.253 |

The binder compound used in this Example was prepared in such a way that a mixture of $TiN_{0.72}$ powder and a powder each of aluminum, nickel and copper was formed into a green compact, which was then heated at 1000° to 1200° C. in vacuo so that TiN could be reacted with the metal to form intermetallic compounds such as $TiAl_3$, TiAl, TiCu, TiNi, $TiNi_2$ and others and was crushed or ground to a powder.

The binder compound was mixed with wBN powder to form a green compact, which was sealed up in a stainless-steel capsule. The capsule was sintered at 1100° C. for 20 minutes under 50 Kb to form a sintered compact of a dense structure according to the present invention in the same way as Example 17. The lattice constants of TiN in the $TiN_{0.72}$ powder and those in the sintered compacts are tabulated in Table 9.

We claim:

1. A sintered compact for use in a tool consisting essentially of:
   80 to 20 volume % of high pressure from boron nitride; and
   the balance being a matrix of at least one binder compound material selected from the group consisting of a carbide, a nitride, a carbonitride, a boride and a silicide of a IVa a Va transition metal of the periodic table, mixtures thereof and their solid solution compounds; the matrix forming a continuous bonding structure in a sintered body and where the high pressure boron nitride is interspersed within a continuous matrix.

2. A sintered compact as claimed in claim 1, wherein said carbide, nitride and carbonitride of the IVa and Va metal is formulated as $MC_{1\pm x}$, $MN_{1\pm x}$ and $M(C,N)_{1\pm x}$ and in which $(C1\pm x)$ has the value of less than 0.97; wherein M is selected from the group consisting of Ti, Zr, Hf, V, Nb and Ta and x represents the amount of atomic voids in the lattice structure.

3. A sintered compact as claimed in claim 1, wherein 0.1 to 20 volume % of at least one element selected from the group consisting of Al and Si is contained in the sintered, body.

4. A sintered compact as claimed in claim 1, wherein said binder compound material is at least one material selected from the group consisting of a carbide, a nitride and a carbonitride of a IVa metal formulated as $MC_{1\pm x}$, $MN_{1\pm x}$ and $M(C,N)_{1\pm x}$ of which the $(1\pm x)$ value is less than 0.97, said high pressure form of boron nitride is the cubic form boron nitride, and 0.1 to 20 volume % of at least one element selected from the group consisting of Al and Si is contained in the sintered body; wherein M is selected from the group consisting of Ti, Zr, Hf, V, Nb and Ta and x represents the amount of atomic voids in the lattice structure.

5. A sintered compact as claimed in claim 1, wherein 0.1 to 20 volume % of at least one element selected from the group consisting of Ni, Co, Fe and Cu is contained in the sintered body.

6. A sintered compact as claimed in claim 1, wherein said high pressure form boron nitride contains cubic boron nitride which is transformed from the wurtzite form boron nitride during sintering, and said binder compound material is at least one material selected from the group consisting of a carbide, a nitride and a carbonitride of a IVa and a Va metal formulated as $MC_{1\pm x}$, $MN_{1\pm x}$ and $M(C,N)_{1\pm x}$, and the matrix comprises at least one solid solution compound selected from the group consisting of M-C-O, M-N-O and M-C-N-O; wherein M is the IVa and Va metal and x represents the amount of atomic voids in the lattice structure.

7. A sintered compact as claimed in claim 1, wherein the lattice vacancies in the crystals of the carbide, nitride and carbonitride in the matrix is lower than that of the carbide, nitride and carbonitride of the powdered binder compound material, and the lattice constant of the former is larger than that of the latter.

8. A sintered compact as claimed in claim 1, wherein the average particle size of said high pressure form of boron nitride is less than 10 micron.

9. A sintered compact as claimed in claim 1, further comprising a cemented carbide substrate integrally bonded to the sintered body.

* * * * *